US008160599B2

(12) United States Patent
Stanforth et al.

(10) Patent No.: US 8,160,599 B2
(45) **Date of Patent: *Apr. 17, 2012**

(54) SYSTEM AND METHOD FOR MANAGING SPECTRUM ALLOCATION

(75) Inventors: Peter Stanforth, Winter Springs, FL (US); Jeffrey C. Schmidt, Orlando, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 419 days.

This patent is subject to a terminal disclaimer.

(21) Appl. No.: 12/423,094

(22) Filed: Apr. 14, 2009

(65) Prior Publication Data

US 2010/0261423 A1 Oct. 14, 2010

(51) Int. Cl.
*H04W 72/00* (2009.01)
*H04W 4/00* (2009.01)

(52) U.S. Cl. ........................................ 455/450; 370/329

(58) Field of Classification Search ................. 455/3.01, 455/450.1, 450.2, 422.1, 552.1, 423, 425, 455/562, 1, 452.1, 450, 452.2, 451, 453, 455/454; 370/329, 328, 230, 468, 462, 236, 370/346, 342, 335; 705/37, 1, 7

See application file for complete search history.

(56) References Cited

U.S. PATENT DOCUMENTS 5,608,727 A 3/1997 Perreault et al.
5,729,531 A 3/1998 Raith et al.
7,088,997 B1 8/2006 Boehmke
7,110,756 B2 9/2006 Diener
7,349,880 B1 3/2008 Kitao
7,460,837 B2 12/2008 Diener
7,830,795 B2 * 11/2010 Zimmerman et al. ........ 370/230
7,877,088 B2 * 1/2011 Tolhurst ..................... 455/422.1
7,990,913 B2 * 8/2011 Massiera et al. .............. 370/328
2003/0032399 A1 2/2003 Slupe
2004/0087310 A1 5/2004 Williamson et al.
2005/0128971 A1 * 6/2005 Huschke et al. .............. 370/328
2006/0031082 A1 2/2006 Amaitis et al.
2006/0083205 A1 * 4/2006 Buddhikot et al. ........... 370/338
2006/0143111 A1 * 6/2006 Mylet ............................. 705/37
2006/0218392 A1 9/2006 Johnston
2006/0234713 A1 10/2006 Oswal et al.
2006/0262768 A1 11/2006 Putzolu
2007/0106596 A1 5/2007 Bayyapu et al.
2007/0274404 A1 11/2007 Papandriopoulos et al.
2008/0052387 A1 2/2008 Heinz et al.

(Continued)

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

(Continued)

*Primary Examiner* — Melody Mehrpour

(74) *Attorney, Agent, or Firm* — Renner, Otto, Boisselle & Sklar, LLP

(57) ABSTRACT

A registration system for secondary radio systems that use spectrum that is interleaved with spectrum used by primary radio systems may include an interface to communicate with the secondary radio systems over a network. The registration system also may receive a registration request from a requesting one of the secondary radio systems and generate a spectrum certificate for the requesting secondary radio system. The spectrum certificate may contain a channel map identifying available channels that may be used for wireless communications activity of the requesting secondary radio system and may contain, for each available channel, a guidance indicator that identifies relative channel desirability to the requesting secondary radio system.

24 Claims, 2 Drawing Sheets

U.S. PATENT DOCUMENTS

| | | | |
|---|---|---|---|
| 2008/0108365 A1 | 5/2008 | Buddhikot et al. | |
| 2008/0112361 A1 * | 5/2008 | Wu | 370/330 |
| 2008/0151743 A1 | 6/2008 | Tong et al. | |
| 2008/0183634 A1 | 7/2008 | Sadler | |
| 2008/0186882 A1 | 8/2008 | Scherzer et al. | |
| 2008/0221951 A1 | 9/2008 | Stanforth et al. | |
| 2008/0222019 A1 | 9/2008 | Stanforth et al. | |
| 2008/0222021 A1 | 9/2008 | Stanforth et al. | |
| 2009/0046625 A1 | 2/2009 | Diener et al. | |
| 2009/0197627 A1 | 8/2009 | Kuffner et al. | |

OTHER PUBLICATIONS

By the Commission, "Second Report and Order, Order on Reconsideration, and Second Further Notice of Proposed Rulemaking", Federal Communications Commission, 2004, FCC 04-167, WT Docket No. 00-230, pp. 1-180.
Prabhu, Krish et al., "Time for Action" Genuine Ideas, 2002, [retrieved online Feb. 1, 2008], <http://www.genuineideas.com/ArticlesIndex/TimeForAction.htm>.
U.S. Spectrum Management Policy: Agenda for the Future, 1991.
Radio Spectrum Management, Module 5 of ICT Regulation Toolkit, ITU, 2007.
FCC 08-260, Second Report and Order and Memorandum Opinion and Order, Adopted Nov. 4, 2008 and Released Nov. 14, 2008.
"Digital Dividend: Cognitive Access, Consultation on License-Exempting Cognitive Devices using Interleaved Spectrum", Ofcom, Publication Date: Feb. 16, 2009.
International Search Report and Written Opinion from corresponding International Application No. PCT/US10/29751.

* cited by examiner

SYSTEM AND METHOD FOR MANAGING SPECTRUM ALLOCATION

TECHNICAL FIELD OF THE INVENTION

The technology of the present disclosure relates generally to wireless communications infrastructure and, more particularly, to a system and method for managing spectrum allocation for spectrum that is used to support wireless communications.

BACKGROUND

Wireless networks and systems are becoming increasingly popular. But wireless communications are constrained due to a lack of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees. A secondary market exists for the Commission licensees to sublease spectrum for use by other parties.

In the U.S., some spectrum may be used without a license, but regulations on the spectrum may be imposed. For example, the FCC has been working on the elimination of analog television (TV) broadcasts in favor of digital TV broadcasts. This will free up spectrum channels for use by unlicensed radio systems to offer various services, such as mobile communications and Internet access. This freed spectrum is commonly referred to as TV whitespace, which is made up of the guard bands and unused TV channels between channel 2 and channel 51 (corresponding to 54 MHz to 698 MHz). To avoid interference with digital TV broadcasts and other incumbent systems, such as wireless microphone systems, radios that use the TV whitespace will be required to register and receive a channel map of available channels that may be used for the communications activity of the radio system. Current regulations require these radio systems to register every twenty-four hours. Also, for mobile radios, if the radio moves into a new location, a new registration is required. Other regulations on the radios are present, such as transmitted power limits for different types of radios. Additional information regarding the regulation of TV whitespace may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in “Digital Dividend: Cognitive-Access Consultation on License-Exempting Cognitive Devices Using Interleaved Spectrum,” published Feb. 16, 2009.

SUMMARY

Although the FCC has identified parameters for the use of TV whitespace, there is room for improvement in the manner in which corresponding spectrum is allocated among radio systems.

According to one aspect of the disclosure, a registration system for secondary radio systems that use spectrum that is interleaved with spectrum used by primary radio systems includes an interface to communicate with the secondary radio systems over a network; and a processor that executes a spectrum allocation function that is stored in a memory. By execution of the spectrum allocation function, the registration system is configured to: receive a registration request from a requesting one of the secondary radio systems; and generate a spectrum certificate for the requesting secondary radio system, the spectrum certificate containing a channel map identifying available channels that may be used for wireless communications activity of the requesting secondary radio system and containing, for each available channel, a guidance indicator that identifies relative channel desirability to the requesting secondary radio system.

According to one embodiment of the registration system, the guidance indicator is determined from attributes of the requesting secondary radio system.

According to one embodiment of the registration system, the attributes of the requesting secondary radio system are selected from radio type, transmit power capability, location, spectral mask, spectrum usage, and combinations thereof.

According to one embodiment of the registration system, the guidance indicator is determined from attributes of commonly located or nearby primary radio systems.

According to one embodiment of the registration system, the attributes of the primary radio systems are selected from location, channel usage, service contour, and combinations thereof.

According to one embodiment of the registration system, the guidance indicator is determined from attributes of previously registered secondary radio systems.

According to one embodiment of the registration system, attributes of the previously registered secondary radio systems includes channel selections made by the previously registered secondary radio systems.

According to one embodiment of the registration system, the attributes of the previously registered secondary radio systems are selected from radio type, transmit power capability, location, spectral mask, spectrum usage, and combinations thereof.

According to one embodiment of the registration system, the guidance indicator is determined from potential interference between the requesting secondary radio system and at least one of another secondary radio system or one of the primary radio systems.

According to one embodiment of the registration system, the guidance indicator is determined from a distribution approach to distribute spectrum usage among the secondary radio systems.

According to one embodiment of the registration system, the guidance indicator is determined from at least one of attributes of the requesting secondary radio system, attributes of commonly located or nearby primary radio systems, attributes of previously registered secondary radio systems, potential interference between the requesting secondary radio system and at least one of another secondary radio system or one of the primary radio systems, a distribution approach to distribute spectrum usage among the secondary radio systems, and combinations thereof.

According to one embodiment of the registration system, the registration request contains a location identifier for the requesting secondary radio system, the location identifier being a partial or full street address.

According to one embodiment of the registration system, the registration request contains a location identifier for the requesting secondary radio system, the location identifier being a channel map of transmission activity of other radio devices, and the location is derived by the registration system using reverse triangulation based on the channel map from the requesting secondary radio system.

According to one embodiment of the registration system, the registration system is further configured to receive a channel selection from the requesting secondary radio system and a reason for the channel selection.

According to one embodiment of the registration system, the generation of future guidance indicators is determined using the reason provided by the secondary radio system.

According to one embodiment of the registration system, the spectrum certificate further contains a time frame for which the channel map is valid.

According to one embodiment of the registration system, the time frame is determined from attributes of the requesting secondary radio system and from attributes and spectrum usage by other commonly located or nearby secondary radio systems.

According to another aspect of the disclosure, a secondary radio system that uses spectrum that is interleaved with spectrum used by primary radio systems for wireless communications activity includes a transceiver for engaging in the wireless communications activity; a controller for managing secondary radio system operation such that the secondary radio system is configured to: transmit a registration request to a registration system; receive a spectrum certificate from the registration system, the spectrum certificate containing a channel map identifying available channels that may be used for the wireless communications activity of the secondary radio system and containing, for each available channel, a guidance indicator that identifies relative channel desirability to the secondary radio system; and select one of the available channels for the wireless communications activity.

According to one embodiment of the secondary radio system, the registration request contains a location identifier for the secondary radio system, the location identifier being a partial or full street address.

According to one embodiment of the secondary radio system, the registration request contains a location identifier for the secondary radio system, the location identifier being a channel map of transmission activity of other radio devices.

According to one embodiment of the secondary radio system, the secondary radio system is further configured to transmit the channel selection to the registration system.

According to one embodiment of the secondary radio system, the secondary radio system is further configured to transmit a reason for the channel selection to the registration system.

According to one embodiment of the secondary radio system, the spectrum certificate further contains a time frame for which the channel map is valid.

According to one embodiment of the secondary radio system, the time frame is determined from attributes of the secondary radio system and from attributes and spectrum usage by other commonly located or nearby secondary radio systems.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
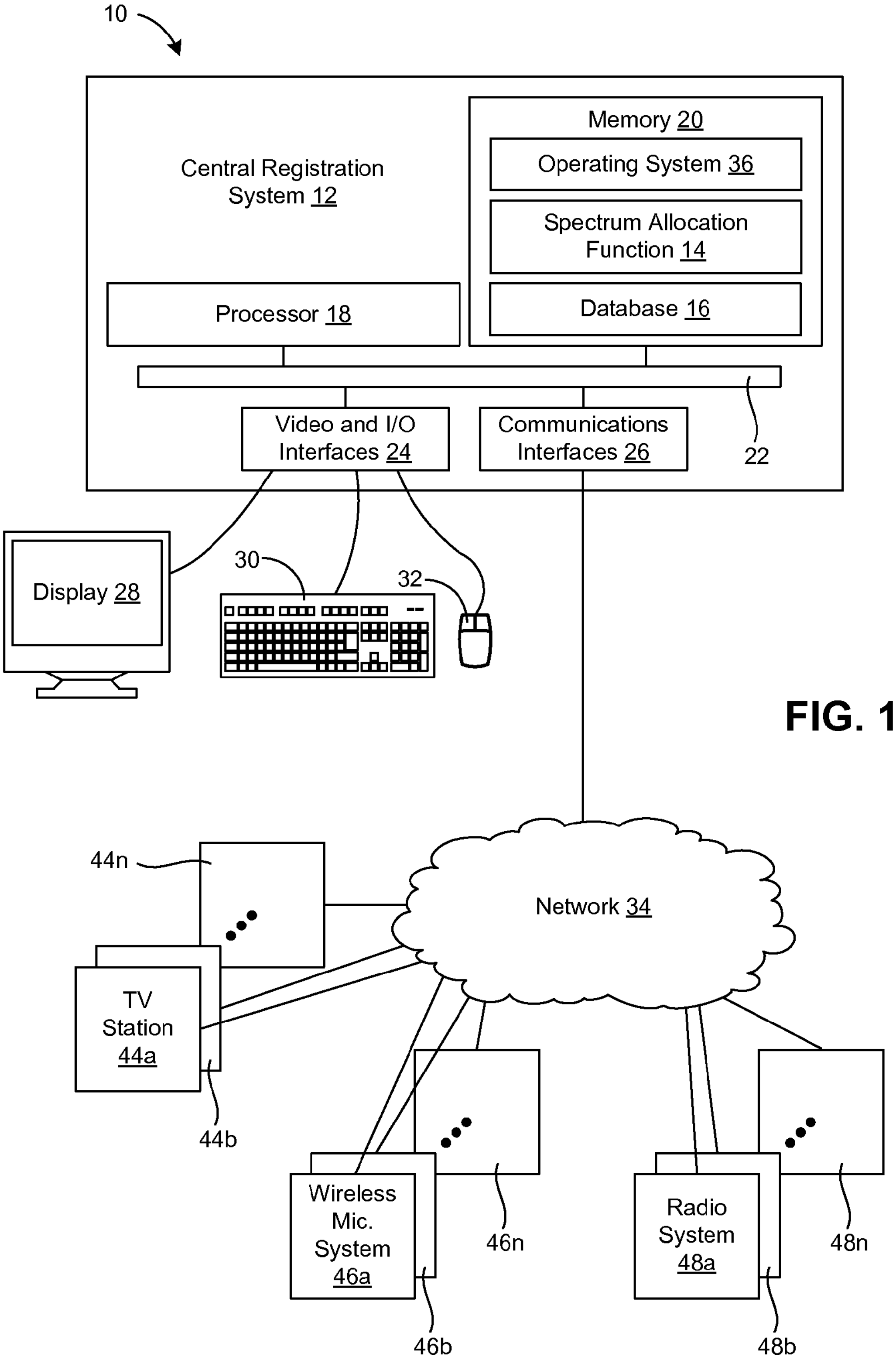
FIG. 1 is a schematic view of an exemplary system for managing spectrum allocation.

Embodiments will now be described with reference to the drawings, wherein like reference numerals are used to refer to like elements throughout. It will be understood that the figures are not necessarily to scale.

A. Overview

A(1). Parties

In this document, described are various entities that may have a relationship to electromagnetic spectrum for use in wireless communications. One entity is a government or regulatory agency. In the United States, the governmental agency may be the FCC. The governmental agency controls the rules and/or regulations for how wireless spectrum may be used. Exemplary rules governing certain spectrum are described in the above-mentioned FCC 08-260. Another exemplary agency is Ofcom in the United Kingdom.

Another party may be incumbent spectrum users. Incumbent spectrum users may be user types that have priority to certain spectrum or have "grandfather" provisions so as to have access to certain spectrum. Exemplary incumbent users to spectrum in the historical analog TV broadcast channels are TV stations that broadcast using digital signals. Other exemplary incumbent users to spectrum in the historical analog TV broadcast channels are wireless microphone systems.

Another party may be radio systems that desire spectrum to operate, such as for offering wireless communications and Internet access to mobile client devices. With the transition of analog TV broadcasts to digital TV broadcasts, radios may seek registration in accordance with FCC 08-260 to gain access to TV whitespace. These radios are referred to TV whitespace band radios (TVBDs).

Still another party may be an entity or system that manages registration of the various other parties that use the historical analog TV broadcast channels. This party may carry out such management using a central registration system as described in greater detail below.

A(2). Wireless Communications Context

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

In addition, the systems and methods are described in the exemplary context of managing TV whitespace. However, the systems and method may be applied to other circumstances where radios register for spectrum use. Radio systems with priority to the spectrum in question will be referred to as primary spectrum users or primary radio systems. In the exemplary context of TV whitespace, primary spectrum users may be, for example, the incumbent radio systems described in this document. Radio systems that have spectrum access rights that are subservient to the primary spectrum users will be referred to as secondary spectrum users or secondary radio systems. In the exemplary context of TV whitespace, secondary spectrum users may be, for example, the TVBDs described in this document. The secondary radio systems may use spectrum that is interleaved with spectrum used by the primary radio systems. Therefore, this document describes a registration system for secondary radio systems that use spectrum that is interleaved with spectrum used by primary radio systems and related methods, as well as secondary radio systems that use such spectrum.

B. System Architecture

With reference to FIG. 1, illustrated is a schematic block diagram of a computer-based system 10 capable of executing computer applications (e.g., software programs). The system 10 may include a central registration system 12 that is implemented using computer technology. The central registration system 12 may be configured to execute a spectrum allocation function 14 and to store a database 16 that contains data regarding spectrum information that is used by the spectrum allocation function 14.

In one embodiment, the spectrum allocation function 14 is embodied as one or more computer programs (e.g., one or more software applications including compilations of executable code). The computer program(s) and/or database 16 may be stored on a machine (e.g., computer) readable medium, such as a magnetic, optical or electronic storage device (e.g., hard disk, optical disk, flash memory, etc.).

To execute the function 14, the system 12 may include one or more processors 18 used to execute instructions that carry out a specified logic routine(s). In addition, the system 12 may have a memory 20 for storing data, logic routine instructions, computer programs, files, operating system instructions, and the like. As illustrated, the function 14 and the database 16 may be stored by the memory 20. The memory 20 may comprise several devices, including volatile and non-volatile memory components. Accordingly, the memory 20 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The processor 18 and the components of the memory 20 may be coupled using a local interface 22. The local interface 22 may be, for example, a data bus with accompanying control bus, a network, or other subsystem.

The system 12 may have various video and input/output (I/O) interfaces 24 as well as one or more communications interfaces 26. The interfaces 24 may be used to operatively couple the computer system 10 to various peripherals, such as a display 28, a keyboard 30, a mouse 32, other input devices, a microphone (not shown), a camera (not shown), a scanner (not shown), a printer (not shown), a speaker (not shown) and so forth. The communications interfaces 26 may include for example, a modem and/or a network interface card. The communications interfaces 26 may enable the system 10 to send and receive data signals, voice signals, video signals, and the like to and from other computing devices via an external network 34 (e.g., the Internet, a wide area network (WAN), a local area network (LAN), direct data link, or similar systems). The interface between the system 12 and any operatively interfaced device or network may be wired or wireless.

The memory 20 may store an operating system 36 that is executed by the processor 18 to control the allocation and usage of resources in the system 12, as well as provide basic user interface features. Specifically, the operating system 36 controls the allocation and usage of the memory 20, the processing time of the processor 18 dedicated to various applications being executed by the processor 18, and the peripheral devices, as well as performing other functionality. In this manner, the operating system 36 serves as the foundation on which applications, such as the function 14, depend as is generally known by those with ordinary skill in the art. The operating system 36 also may control much of the user interface environment presented to a user, such as features of the overall graphical user interface (GUI) for the system 12.

In one embodiment, the system 12 may be configured as a server that executes the function 14 to host the below-described spectrum management functions. The spectrum management functions include providing spectrum certificates to qualified parties so that the parties may make use of spectrum for wireless communications. In the illustrated example, these parties include one or more incumbent spectrum users, such as the illustrated TV stations 44*a* through 44*n* and the illustrated wireless microphone systems 46*a* through 46*n*. Also, the parties may include one or more radio systems 48*a* through 48*n*. In the exemplary context of managing spectrum for TV whitespace, the radio systems 48*a* through 48*n* may be TVBD radio systems. Each radio system 48 may be an individual radio device or a network of radio devices. Also, each radio system 48 may include at least one transceiver for engaging in wireless communications and a controller for managing radio system operation, including the registration and channel selection functions described below.

It is contemplated that there may be hundreds or thousands of incumbent systems and thousands or millions of TVBD radio systems. Under current FCC procedure, TVBD radios will register every twenty-four hours. Also, for mobile TVBD radios that do not have a fixed location, the mobile TVBD radio will register each time the TVBD radio changes location. Therefore, to handle registration volume of the systems 44, 46 and 48, the central registration system 12 may be scaled to handle a high volume of registration requests. Furthermore, the central registration system 12 may have a distributed architecture, and may include plural server systems. The systems 44, 46 and 48 may interact with the central registration system 12 for registration purposes over the Internet using electronic messaging. Furthermore, the function 14 may be considered an expert system for generating meaningful spectrum certificates that increase the operational capacity of the corresponding spectrum and reduces interference among systems that use the spectrum.

While the registration process for at least the radio systems 48 may be fully automated, the function 14 may host an Internet-style website for the various parties to conduct initial enrollment with the system 12, conduct manual registration if needed, access various tools and reports supplied by the function 14, and so forth.

C. Spectrum Allocation

Figure 2:
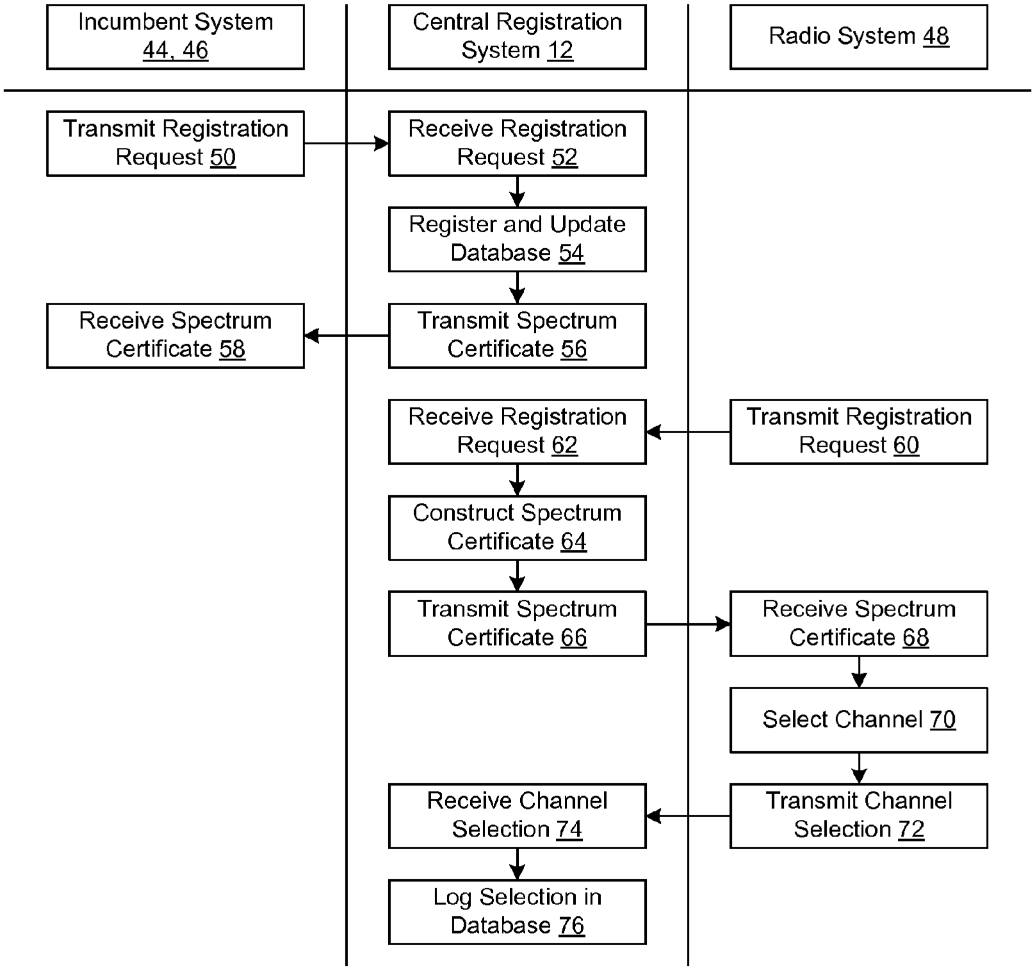
FIG. 2 is a flow diagram representing exemplary actions taken by various components of the system of FIG. 1.

With additional reference to FIG. 2, illustrated are logical operations to implement exemplary methods of managing spectrum. The exemplary methods may be carried out by executing an embodiment of the spectrum allocation function 14, for example. Thus, the flow diagram may be thought of as depicting steps of one or more methods carried out by the system 10. Although the flow charts show specific orders of executing functional logic blocks, the order of executing the blocks may be changed relative to the order shown. Also, two or more blocks shown in succession may be executed concurrently or with partial concurrence. Furthermore, the registration process for one incumbent device 44 or 46 and one radio system 48 is described. The described functions may be repeated for all incumbent devices 44 or 46 and for all radio systems 48 so that appropriate spectrum certificates are provided to each qualified spectrum user.

C(1). Incumbent Devices

Operators of appropriate incumbent systems may enroll with the central registration system 12 to make registration for spectrum use in accordance with governmental agency regulation. For example, operators of licensed TV stations 44 may enroll with the system 12 and request registration in block 50. The registration request may be received by the system in block 52.

Information that is provided by the TV station 44 may include channel definitions and broadcast parameters, such as antenna location, antenna configuration, broadcast power and so forth. Other information, such an operator identity, operator contact information, FCC license information, and other profile information may be supplied to the system 12. From this information, the system 12 may complete the registration in block 54 and, in block 56, transmit a registration in the form of a spectrum certificate to the TV station 44. The TV station 44 may receive the spectrum certificate in block 58.

The spectrum certificate may be a data object that contains a channel map of available channels under which the TV station 44 may operate. For a TV station 44, it is contemplated that the channel map will be the same as the channel definitions supplied by the TV station 44. The spectrum certificate also may include information concerning a time window in which the spectrum certificate is valid. At or near the expiration of the time window, the TV station 44 may reregister to obtain a new spectrum certificate. In other embodiments, the TV station 44 may operate without a spectrum certificate, in which case blocks 56 and 58 may be omitted.

Returning to the functions of block 54, the system 12 may generate a grade B contour for the TV station 44. In one embodiment, the grade B contour may be calculated using information relating to the TV station 44, such as channel, antenna height, antenna site, transmitter power, and so forth. The grade B contour and the channel map contained in the associated spectrum certificate may be logged in the database 16. The logged information provides a record of the location in which the TV station 44 operates and the channel(s) (e.g., frequency or frequencies) used by the TV station 44. In one embodiment, the location may be a two dimensional area. The location may be defined in any appropriate manner, such as by using sets of coordinates (e.g., longitude and latitude, world geodetic system (WGS), geographical information system (GIS) data), zip codes, metropolitan boundaries, "FCC defined areas" (e.g., major trading areas (MTAs) or basic trading areas (BTAs)), and so forth. As will be understood, the location and corresponding channel map associated with a TV station 44 is used spectrum. To avoid interference, allocation of used spectrum to another system should be minimized.

Other types of incumbent systems may enroll with the central registration system 12 to make registration for spectrum use in accordance with governmental agency regulation. Incumbent TV whitespace operators may include the illustrated wireless microphone systems 46. Another exemplary incumbent TV whitespace operator is a cable head end, but other types of incumbent users are possible.

Following the example of wireless microphone systems 46, operators of wireless microphone systems 46 may enroll with the system 12 and request registration in block 50. The registration request may be received by the system in block 52. Information that is provided by the wireless microphone system 46 may include make and model of the transceivers that form the system 46, channel or channels, location, contact information, and so forth. From this information, the system 12 may complete the registration in block 54 and, in block 56, transmit a registration in the form of a spectrum certificate to the wireless microphone system 46. The wireless microphone system 46 may receive the spectrum certificate in block 58. Also, a grade B contour may be calculated for the system 46.

Wireless microphone systems 46 tend to be used a predictable manner, such as on certain dates. For instance, a wireless microphone system 46 may be used for a given week for a theatrical show or over the course of two days for a certain event. Some of the systems may move locations and other systems may be used in conjunction with one facility (e.g., an arena or a college campus), and on a frequent or unpredictable basis. For wireless microphone systems 46 that have predictable use in terms of location and time, the registration of the wireless microphone system 46 for a known location may include a time window. In this manner, the spectrum certification may include a corresponding time window during which the registration is valid. The time window may be for longer than a day (e.g., for a number of days, for a week, for a month, etc.) and may be discontinuous in time (e.g., for every Saturday).

As indicated, the spectrum certificate may be a data object that contains a channel map of available channels under which the wireless microphone system 46 (or other incumbent system) may operate. For a wireless microphone system 46 or other incumbent system, it is contemplated that the channel map will be the same as the channel information supplied by the incumbent system. The spectrum certificate also may include information concerning any time window in which the spectrum certificate is valid. At or near the expiration of the time window, the incumbent system 44 may reregister to obtain a new spectrum certificate. In other embodiments, the incumbent system may operate without a spectrum certificate, in which case blocks 56 and 58 may be omitted.

Returning to the functions of block 54, the system may generate a grade B contour for the incumbent system. The grade B contour and the channel map contained in the associated spectrum certificate may be logged in the database 16. The logged information provides a record of the location in which incumbent system operates, the channel(s) (e.g., frequency or frequencies) used by the incumbent system and, if applicable, when the incumbent system operates. The location may be a two dimensional area are described above. As will be understood, the location and corresponding channel map associated with an incumbent system is used spectrum during the times of operation. To avoid interference, allocation of used spectrum to another system should be minimized.

C(2). Whitespace Band Radios

With continued reference to FIGS. 1 and 2, the radio system 48 may register with the central registration system 12 to receive a spectrum certificate with information relating to available channels in which the radio system 48 may operate. The available channels may not be contiguous in frequency. In one embodiment, the radio system 48 may undergo an initial enrollment by supplying various information, such as FCC identifier (FCC id), device serial number, contact information of a responsible person or entity (e.g., contact name, street and/or mailing address, electronic mail address, telephone number, etc.), and any other appropriate information.

The FCC id and serial number may be validated against data that is previously supplied by radio equipment manufacturers. Also, using the data from the radio equipment manufacturer or information supplied by the radio system 48, the central registration system 12 may identify characteristics of the radio system 48, such as fixed or mobile device, radio type, and so forth. If the validation process indicates that the enrollment attempt is not legitimate, an alarm may be generated that may lead to investigation concerning the radio system 48.

If the data supplied by the radio system is valid, the enrollment process may continue. For instance, the radio system 48 may be granted a temporary authorization to acquire spectrum certificates. For instance, the temporary authorization may last for a predetermined number of days, such as forty-five days. During the temporary authorization, conditions to acquire permanent authorization to acquire spectrum certificates may be completed. An exemplary condition includes payment of appropriate fees by the radio system 48, the device manufacturer, or another party. Another exemplary condition includes satisfaction of a challenge, such as the operator of the radio system 48 successfully using a link to an Internet page that is transmitted from the central registration system 12 via electronic mail.

An exemplary registration process for the radio system 48 may commence in block 60 where the radio system 48 transmits a registration request to the central registration system 12. The registration request may identify the radio system 48 and may include information to ascertain a location of the radio system 48. Location information may be determined in any appropriate manner. For instance, location may be determined using a triangulation method. A common triangulation method is by using a global position system (GPS) or assisted GPS (AGPS) approximation of location. Another location determination technique is to use a postal address, such as a street address or a zip code (e.g., in the United States a "zip+4" code may provide a sufficiently accurate location estimation).

Another location determining technique may involve reverse triangulation using a channel map provided by the radio system 48. For instance, the radio system 48 may identity the channels on which the radio system 48 detects (or "sees") transmission activity and corresponding signal strengths. From matching this information to known service contours of the radio devices, the central registration system 12 may estimate the location of the radio system 28. Also, the information provided by the radio system 48 represents data of actual broadcasts by other radio devices that may be used to adjust calculated contours for the corresponding incumbent systems 44, 46, or other radio systems. In this manner, the database of used channels for the location the radio system 48 may be adjusted based on feedback from various radio systems 48.

In block 62, the registration request may be received by the central registration system 12. Then, in block 64, the central registration system 12 may process the registration request. A spectrum certificate for the requesting radio system 48 may be constructed. In one embodiment, data maintained in the database 16 may be compared to the location contained in the request to identify any available channels that the radio system 48 may use for wireless communications. The identification may include determining which channels are in use by incumbent systems 44, 46 for the location of the radio system 48. Those channels will be considered not available for use by the radio system 48. Also, the type of radio system making the request and/or the spectral mask of the radio system making the request may indicate that certain channels are unavailable. In the exemplary context of TV whitespace, any unused channels for the location of the radio system 48 and that the radio system 48 is permitted to use based on radio type and spectral mask may be considered TV whitespace that is available for use by the radio system 48. In effect, the channel map results from a mapping of available channels into the spectral mask of the requesting radio system 48.

A channel map for the radio system 48 may established using the channel availability information. In one embodiment, the channel map is a list of available channels. In another embodiment, the channel map is a list of channels that are not available. In another embodiment, the channel map is a complete list of channels across a spectrum range in question and corresponding availabilities. Table 1 represents an exemplary channel map established under this technique for a situation where there are fifty channels that are numbered channels 2 through 51, and where channels 2, 3, 4, 47 and 49 are not available to the requesting radio system 48.

TABLE 1

| Channel Identifier | Availability |
|---|---|
| 2 | Not available |
| 3 | Not available |
| 4 | Not available |
| 5 | Available |
| 6 | Available |
| 7 | Available |
| . | . |
| . | . |
| . | . |
| 47 | Not available |
| 48 | Available |
| 49 | Not available |
| 50 | Available |
| 51 | Available |

In another embodiment, information in the spectrum certificate may be used to provide more guidance to the radio system 48 beyond a binary-type value of whether a channel is available or not available for use. In addition, the information may be constructed in a way to steer the channel choice of the radio system 48. An exemplary reason to lead the radio system 48 to choose one channel over another channel includes avoiding interference with operation of another radio system 48 or incumbent device 44, 46. Another exemplary reason to lead the radio system 48 to choose one channel over another includes maximizing spectrum usage by distributing radios systems 48 among various channels.

A number of factors may be used to construct a spectrum certificate with channel selection guidance. In this manner, the central registration system 12 functions as an expert engine to provide an intelligent channel map based on location, radio type, spectrum usage and the presence of other radio devices. The factors that contribute to the channel map generation may include requesting radio system 48 attributes including, but not limited to, radio type, transmit power capability, location, spectral mask, spectrum usage, and so forth. Other factors may include the location, channel usage, and service contour (e.g., grade B contour) associated with commonly located or nearby incumbent systems 44, 46. Additional factors may include the location and radio system attributes of other registered radio systems 48 that are commonly located or nearby the requesting radio system 48. The considered attributes of the other radio systems 48 may include, but are not limited to, radio type, transmit power capability, location, spectral mask, spectrum usage, and so forth. In addition, the channel guidance provided to and/or the actual channel selection of those commonly located or nearby radio systems 48 also may be used in the construction of the spectrum certificate with channel selection guidance. Collection of some of this information will be described in greater detail below.

Using the foregoing factors, a logical map of spectrum usage for the location of the requesting radio system 48 may be established. Channel availability based on incumbent system use may be determined. For the available channels, each channel may be evaluated for the potential for interference with another system and/or for the efficient distribution of spectrum use. In one embodiment, the results of this analysis may be a grade, or guidance value, for each channel. The guidance value may reflect how much interference the radio system 48 may expect to encounter for the corresponding channel.

The guidance values may be further established using a strategy for distributing whitespace channel usage in a given location among plural radio systems 48 to achieve efficient channel loading. For instance, a round robin approach or a statistical distribution approach may be used to assign the most favorable guidance values in the channel maps for each requesting radio system 48 in a particular location. Also, if a distribution approach is used, the distribution approach may be adapted or weighted based on other criteria, such as radio type, transmit power other radios using the various channels, congestion on available channels, etc.

The guidance values may be incorporated into the spectrum certificate evaluation to provide a graduated response to the requesting radio system 28 so that the requesting radio system 48 may make a guided channel selection. Channel selection by the requesting radio system 48 is described in greater detail below.

As an example, Table 2 shows an exemplary channel map for a requesting radio system 48 with guidance values for each channel. In the exemplary embodiment, each guidance value is in the range of zero to nine. A value of zero indicates that the channel is not available, which may be the result of incumbent system use or a high potential for interference to the requesting radio system 48 or by the requesting radio system 48. A value of nine indicates that the channel is likely to be the most desirable for the radio system 48 based on known usage of spectrum in the location of the requesting radio system 48, based on spectrum certificates provided to other radio systems 48, and/or based on any applied distribution technique. The values one through eight represent some level of congestion, possible interference or other use, but that the channel is available for use by the requesting radio system 48. The lower the number, however, the less desirable the channel ought to be to the requesting radio device 48.

TABLE 2

| Channel Identifier | Guidance Value |
|---|---|
| 2 | 0 |
| 3 | 0 |
| 4 | 0 |
| 5 | 3 |
| 6 | 9 |
| 7 | 9 |
| . | . |
| . | . |
| . | . |
| 47 | 0 |
| 48 | 4 |
| 49 | 0 |
| 50 | 4 |
| 51 | 8 |

The spectrum certificate may be a data object and, in addition to the channel map, the spectrum certificate may contain other relevant information. For example, a time at which the spectrum certificate expires may be present. At the arrival of the specified time, the radio system 48 may reregister. Following current FCC guidelines for use of TV whitespace, the spectrum certificate may be valid for twenty-four hours. However, it is possible that there may be situations in which a spectrum certificate is valid for less than or more than twenty-four hours.

For instance, the time frame for which the spectrum certificate is valid may be related to the dynamic nature of radio system 48 and/or the dynamic nature of other neighboring (e.g., commonly located or nearby) radio systems 48. The radio systems 48 may be dynamic in the sense that some of the radio systems 48 may not use spectrum in the same location at all times. For example, some of the radio systems 48 may be mobile, and some of the radio systems 48 may not operate a certain times or may be desire spectrum for a limited period of time (e.g., a week or a month). Therefore, the time period that the spectrum certificate is valid may be determined using a time period requested by the radio system 48 and/or knowledge about the spectrum use plans by other radio systems 48. Using these factors, the time period specified in the spectrum certificate may be determined so that the associated channel map is viable for as long as possible, while minimizing the possibility that conditions leading to the generation of the channel map have changed.

Following block 64, the logical flow may continue in block 66 where the spectrum certificate with the channel map may be transmitted to the requesting radio system 48. The spectrum certificate may be received by the requesting radio system 48 in block 68. Following receipt of the spectrum certificate, in block 70 the radio system 48 may select one of the available channels for use in connection with the wireless communications activity of the radio system 48.

Channel selection may be based on any appropriate criteria. For example, the radio system 48 may simply select an available channel. In other embodiments, the radio system 48 may listen to broadcast activity on the available channels to make a "self-determination" as to which channel or channels may be relatively interference-free. Also, the radio system 48 may undertake other assessments of channel suitability. As will be understood, a radio system that is indoors may perform differently than a radio system that is outside, and a radio system that is in a canyon may perform differently than a radio system that is on top of a hill or a tall tower. Therefore, such assessments may include analyzing performance for the available channels to determine which channel or channels may be most suitable for the communications activity of the radio system 48. Also, depending on the bandwidth needs of the radio system 48, the radio system 48 may select more than one channel on which to operate.

Also, in the embodiment where the available channels are identified with a guidance value, the guidance value may be considered. In some embodiments, the guidance value may be the only criteria evaluated by the radio system. In other embodiments, the guidance value may be used as a weighting factor in combination with an interference assessment and/or a performance assessment made by the radio system. For instance, if two channels have approximately the same results for potential interference and/or performance, the channel with the higher guidance value may be selected.

Once the radio system has selected a channel in block 70, the logical flow may proceed to block 72 where the channel selection is transmitted to the central registration system 12. In one embodiment, the radio system 48 also may transmit one or more reasons as to why the channel was selected. The reasons may include, for example, that the channel was selected by default operation, that the channel was selected based on perceived interference, that the channel was selected based on perceived performance, that the channel was selected based on a guidance value associated with the channel map, or that the channel was selected based on a combination of factors. The reasons may be transmitted in the form of a code selected from a plurality of codes, where each code represents one or more of these factors.

The selected channel and the selection reason, if transmitted, may be received by the central registration system 12 in block 74. Then, in block 76, the channel selection and reason, if received, may be logged in the database 16 for future use. For example, the channel selections and corresponding reasons that are provided by the radio systems 48 may provide a feedback mechanism with valuable information to improve the guidance operation of the spectrum allocation function 14 when constructing future channel maps in block 64.

In one embodiment, the channel selection of a first radio system 48 may be used during the establishment of guidance values for a channel map for a second requesting radio system 48 that has a similar location to the first radio system 48. Since the channel selection information indicates that the selected channel is at least partially occupied, the corresponding guidance value for that channel for the second requesting radio system 48 may be lower than if there was no knowledge that the channel had been selected. This may guide the second requesting radio system 48 toward selection of a different channel than was selected by the first radio system 48, thereby reducing the possibility of interference and distributing wireless communication across plural channels.

In one embodiment, the channel selection and/or reason may be used to assess if prior guidance values were more lenient or more conservative than actual conditions warranted. Future guidance value generation then may be adjusted to better serve the radio systems 48. Also, the channel selection and/or reason may be used to learn channel selections that are made by specific radio systems 48 to optimize performance. Learned channel selection behavior then may be used in the future to elevate the guidance value for the optimal channel(s) for the corresponding radio system 48 in the future.

In addition to channel guidance, the spectrum certificate may include a recommendation for a transmitted power limit of the radio system 48. The power limit recommendation may be established to maximize channel allocation and reducing potential interference under the theory that if the radio systems 48 collectively use less power, more radio systems 48 may make efficient use of the available spectrum.

D. Administrative Functions

In addition to providing registration services, the central registration system 12 may make administrative functions available to various interested parties. For example, operators of the TV stations 44 may be able to view channel definitions and parameters that contribute to the database definition of the corresponding TV station contour. The operators may be able to revise the profile to correct errors or make updates. Furthermore, the TV station operators may be able to view reports and graphical representations of TVBDs that are registered to operate within the service contour of the TV station. Furthermore, the TV station operators may be able to create interference reports. Inference reports may be investigated and remedial action against radio systems that cause interference may be taken. Other types of incumbent systems may be able to use these or similar administrative functions.

Manufacturers of radio equipment may be able to submit information concerning equipment that they have placed into the market. Information about the radio equipment may include FCC id and MAC address parameters that are later used by the radio systems 48 to carry out enrollment and registration. The manufacturer of radio equipment also may be able to obtain reports relating to registered TVBDs by geography, type and first registration date.

Another function of the central registration system 12 may be a stolen radio tracking function. For example, radio owners may identify a stolen item of radio equipment. Then, if that radio equipment attempts to register, an alert report may be generated and sent to the owner or other appropriate agency or entity for further action.

The FCC, or other appropriate governmental agency, may be provided with mechanisms to access various information from the central registration system 12. Exemplary information includes channel service contours and parameters for TV stations, as well as channels used for land mobile radios (LMRs) or other specified applications. Also, the FCC may be able to access reports regarding deployed TVBDs by geography, device type, manufacturer, etc. Various alarm services and device tracking may be made available to the FCC, such as alarms to track duplicate TVBDs, alarms to identify unknown or invalid TVBDs, alarms to track blocked or stolen TVBDs, etc.

Furthermore, the FCC may use the central registration system 12 to block TVBDs from receiving spectrum certificates and to unblock blocked TVBDs if circumstances warrant. TVBDs may be blocked when the TVBD causes unauthorized interference, is reported as stolen, or for some other valid reason.

Third parties or any other party mentioned herein may be able to access the central registration system 12 to submit a channel availability query for a specific location. A report may be returned that contains information regarding permitted use for each channel, such as each of channels 2 through 51 in the specified location.

E. Conclusion

As will be apparent, the central registration system 12 may coordinate channel selection behavior of radio systems 48 that seek to use whitespace-regulated spectrum, while also protecting incumbent systems from interference.

Although certain embodiments have been shown and described, it is understood that equivalents and modifications falling within the scope of the appended claims will occur to others who are skilled in the art upon the reading and understanding of this specification.

What is claimed is:

1. A registration system for secondary radio systems that use spectrum that is interleaved with spectrum used by primary radio systems, comprising:

an interface to communicate with the secondary radio systems over a network; and a processor that executes a spectrum allocation function that is stored in a memory and, by execution of the spectrum allocation function, the registration system configured to:

receive a registration request from a requesting one of the secondary radio systems; and generate a spectrum certificate for the requesting secondary radio system, the spectrum certificate containing a channel map identifying available channels that the requesting one of the secondary radio systems is entitled to use for wireless communications activity and containing, for each available channel, a guidance indicator that identifies relative channel desirability to the requesting secondary radio system, the available channels being further available for use by any of the secondary radio systems in a location of the requesting one of the secondary radio systems.

2. The registration system of claim 1, wherein the guidance indicator is determined from attributes of the requesting secondary radio system.

3. The registration system of claim 2, wherein the attributes of the requesting secondary radio system are selected from radio type, transmit power capability, location, spectral mask, spectrum usage, and combinations thereof.

4. The registration system of claim 1, wherein the guidance indicator is determined from attributes of commonly located or nearby primary radio systems.

5. The registration system of claim 4, wherein the attributes of the primary radio systems are selected from location, channel usage, service contour, and combinations thereof.

6. The registration system of claim 1, wherein the guidance indicator is determined from attributes of previously registered secondary radio systems.

7. The registration system of claim 6, wherein attributes of the previously registered secondary radio systems includes channel selections made by the previously registered secondary radio systems.

8. The registration system of claim 6, wherein the attributes of the previously registered secondary radio systems are selected from radio type, transmit power capability, location, spectral mask, spectrum usage, and combinations thereof.

9. The registration system of claim 1, wherein the guidance indicator is determined from potential interference between the requesting secondary radio system and at least one of another secondary radio system or one of the primary radio systems.

10. The registration system of claim 1, wherein the guidance indicator is determined from a distribution approach to distribute spectrum usage among the secondary radio systems.

11. The registration system of claim 1, wherein the guidance indicator is determined from at least one of attributes of the requesting secondary radio system, attributes of commonly located or nearby primary radio systems, attributes of previously registered secondary radio systems, potential interference between the requesting secondary radio system and at least one of another secondary radio system or one of the primary radio systems, a distribution approach to distribute spectrum usage among the secondary radio systems, and combinations thereof.

12. The registration system of claim 1, wherein the registration request contains a location identifier for the requesting secondary radio system, the location identifier being a partial or full street address.

13. The registration system of claim 1, wherein the registration request contains a location identifier for the requesting secondary radio system, the location identifier being a channel map of transmission activity of other radio devices, and the location is derived by the registration system using reverse triangulation based on the channel map from the requesting secondary radio system.

14. The registration system of claim 1, wherein the registration system is further configured to receive a channel selection from the requesting secondary radio system and a reason for the channel selection.

15. The registration system of claim 14, wherein the generation of future guidance indicators is determined using the reason provided by the secondary radio system.

16. The registration system of claim 1, wherein the spectrum certificate further contains a time frame for which the channel map is valid.

17. The registration system of claim 16, wherein the time frame is determined from attributes of the requesting secondary radio system and from attributes and spectrum usage by other commonly located or nearby secondary radio systems.

18. A secondary radio system that uses spectrum that is interleaved with spectrum used by primary radio systems for wireless communications activity, comprising:

a transceiver for engaging in the wireless communications activity;

a controller for managing secondary radio system operation such that the secondary radio system is configured to:

transmit a registration request to a registration system;

receive a spectrum certificate from the registration system, the spectrum certificate containing a channel map identifying available channels that the secondary radio system is entitled to use for the wireless communications activity and containing, for each available channel, a guidance indicator that identifies relative channel desirability to the secondary radio system; and select one of the available channels for the wireless communications activity with consideration of the guidance indicators and where each of plural additional secondary radio systems in a location of the secondary radio system is entitled to use the selected channel for wireless communications.

19. The secondary radio system of claim 18, wherein the registration request contains a location identifier for the secondary radio system, the location identifier being a partial or full street address.

20. The secondary radio system of claim 18, wherein the registration request contains a location identifier for the secondary radio system, the location identifier being a channel map of transmission activity of other radio devices.

21. The secondary radio system of claim 18, wherein the secondary radio system is further configured to transmit the channel selection to the registration system.

22. The secondary radio system of claim 21, wherein the secondary radio system is further configured to transmit a reason for the channel selection to the registration system.

23. The secondary radio system of claim 18, wherein the spectrum certificate further contains a time frame for which the channel map is valid.

24. The secondary radio system of claim 23, wherein the time frame is determined from attributes of the secondary radio system and from attributes and spectrum usage by other commonly located or nearby secondary radio systems.

* * * * *